United States Patent
Jain et al.

(10) Patent No.: US 11,792,270 B2
(45) Date of Patent: Oct. 17, 2023

(54) OFFLINE SIDELOADING FOR ENROLLMENT OF DEVICES IN A MOBILE DEVICE MANAGEMENT SYSTEM

(71) Applicant: VMware, inc., Palo Alto, CA (US)

(72) Inventors: Adarsh Jain, Atlanta, GA (US); Kalyan Regula, Alpharetta, GA (US); Prasad Sawant, Sunnyvale, CA (US); Ravishankar Chamarajnagar, Duluth, GA (US); Michael Jones, Hudson, OH (US); Hai James Le, Suwanee, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/735,561

(22) Filed: May 3, 2022

(65) Prior Publication Data

US 2022/0272575 A1    Aug. 25, 2022

Related U.S. Application Data

(63) Continuation of application No. 16/734,016, filed on Jan. 3, 2020, now Pat. No. 11,349,928, which is a
(Continued)

(51) Int. Cl.
*H04L 67/125* (2022.01)
*H04L 67/303* (2022.01)
(Continued)

(52) U.S. Cl.
CPC ........ *H04L 67/125* (2013.01); *H04L 41/0809* (2013.01); *H04L 41/0869* (2013.01);
(Continued)

(58) Field of Classification Search
CPC ....... H04L 41/12; H04L 41/08; H04L 41/046; H04L 41/0806; H04L 41/081;
(Continued)

(56) References Cited

U.S. PATENT DOCUMENTS 9,760,528 B1 * 9/2017 Huynh Van ......... H04L 41/0843
9,928,082 B1 * 3/2018 Huynh Van ............. H04L 67/34
(Continued)

*Primary Examiner* — Tae K Kim
(74) *Attorney, Agent, or Firm* — Clayton, McKay & Bailey, PC

(57) ABSTRACT

Systems herein allow an administrator to efficiently enroll computing devices into a mobile device management system, even when those computing devices are offline and not connected to the system. A management server can include a console that allows the administrator to enroll an offline computing device by selecting an offline enrollment option on a registration record. This option can cause the management server to create a device record, indicating the computing device is enrolled. The management server can also create and save a provisioning file onto a storage device, such as a USB drive. Assets, such as graphics and applications, specified by the device record are also saved onto the storage device. The storage device can be physically connected to the computing device, at which point the provisioning file guides automatic installation of the assets and implementation of device settings and compliance rules specified by the device record.

20 Claims, 6 Drawing Sheets

Related U.S. Application Data continuation of application No. 15/491,973, filed on Apr. 19, 2017, now Pat. No. 10,530,865.

(51) Int. Cl.
| | |
|---|---|
| *H04L 9/40* | (2022.01) |
| *H04L 67/10* | (2022.01) |
| *H04W 12/08* | (2021.01) |
| *H04W 4/60* | (2018.01) |
| *H04L 67/00* | (2022.01) |
| *H04W 4/50* | (2018.01) |
| *H04L 41/22* | (2022.01) |
| *H04L 41/0806* | (2022.01) |
| *H04L 41/0869* | (2022.01) |
| *H04L 41/08* | (2022.01) |
| *H04W 12/37* | (2021.01) |
| *H04W 76/19* | (2018.01) |
| *H04W 28/08* | (2023.01) |
| *H04L 41/046* | (2022.01) |

(52) U.S. Cl.
CPC .......... *H04L 41/0886* (2013.01); *H04L 41/22* (2013.01); *H04L 63/102* (2013.01); *H04L 67/10* (2013.01); *H04L 67/303* (2013.01); *H04L 67/34* (2013.01); *H04W 4/50* (2018.02); *H04W 4/60* (2018.02); *H04W 12/08* (2013.01); *H04W 12/37* (2021.01); *H04W 28/0838* (2020.05); *H04W 28/0925* (2020.05); *H04W 76/19* (2018.02); *H04L 41/046* (2013.01); *H04L 63/20* (2013.01)

(58) Field of Classification Search
CPC ..... H04L 41/0853; H04L 41/22; H04L 67/12; H04L 63/10; H04L 65/1069; H04W 4/70
See application file for complete search history.

(56) References Cited

U.S. PATENT DOCUMENTS

| 10,148,495 | B1* | 12/2018 | Oczkowski | H04W 8/20 |
|---|---|---|---|---|
| 2005/0081198 | A1* | 4/2005 | Cho | G06F 21/123 |
| | | | | 713/150 |
| 2005/0198221 | A1* | 9/2005 | Manchester | H04L 41/26 |
| | | | | 709/223 |
| 2008/0281953 | A1* | 11/2008 | Blaisdell | H04L 67/125 |
| | | | | 709/223 |
| 2009/0254639 | A1* | 10/2009 | Manchester | H04L 63/061 |
| | | | | 714/48 |
| 2010/0198939 | A1* | 8/2010 | Raleigh | H04W 8/22 |
| | | | | 709/224 |
| 2011/0078787 | A1* | 3/2011 | Hamid | H04L 9/3231 |
| | | | | 726/19 |
| 2011/0161659 | A1* | 6/2011 | Himawan | H04L 9/006 |
| | | | | 713/156 |
| 2013/0003969 | A1* | 1/2013 | Farrugia | H04L 9/083 |
| | | | | 380/255 |
| 2013/0031350 | A1* | 1/2013 | Thielen | H04L 63/08 |
| | | | | 713/100 |
| 2013/0065578 | A1* | 3/2013 | Raleigh | H04W 4/24 |
| | | | | 455/419 |
| 2013/0340027 | A1* | 12/2013 | Knudson | H04L 41/0806 |
| | | | | 726/1 |
| 2014/0101449 | A1* | 4/2014 | Trujillo Gonzalez | |
| | | | | H04W 8/183 |
| | | | | 713/171 |
| 2014/0237236 | A1* | 8/2014 | Kalinichenko | H04L 63/18 |
| | | | | 713/168 |
| 2014/0330952 | A1* | 11/2014 | Starsinic | H04W 4/70 |
| | | | | 709/223 |
| 2015/0195069 | A1* | 7/2015 | Yi | H04L 5/0053 |
| | | | | 370/329 |
| 2015/0208366 | A1* | 7/2015 | Papasakellariou | |
| | | | | H04W 72/0446 |
| | | | | 370/311 |
| 2015/0236903 | A1* | 8/2015 | Kodama | H04L 41/0806 |
| | | | | 370/254 |
| 2015/0271130 | A1* | 9/2015 | McCallum | H04L 61/5014 |
| | | | | 709/223 |
| 2016/0043962 | A1* | 2/2016 | Kim | H04L 12/185 |
| | | | | 709/224 |
| 2016/0072839 | A1* | 3/2016 | Mortimore, Jr. | H04L 63/0876 |
| | | | | 726/1 |
| 2016/0087933 | A1* | 3/2016 | Johnson | H04W 12/35 |
| | | | | 709/245 |
| 2016/0112262 | A1* | 4/2016 | Johnson | G06F 9/4411 |
| | | | | 709/221 |
| 2016/0134660 | A1* | 5/2016 | Ponsini | H04L 63/20 |
| | | | | 726/1 |
| 2016/0142243 | A1* | 5/2016 | Karam | G06F 16/13 |
| | | | | 709/202 |
| 2016/0188307 | A1* | 6/2016 | Reagan | H04W 4/60 |
| | | | | 717/177 |
| 2016/0323030 | A1* | 11/2016 | Fujimoto | H04B 7/212 |
| 2016/0337127 | A1* | 11/2016 | Schultz | H04L 9/3234 |
| 2017/0115979 | A1* | 4/2017 | Murthy | H04L 67/51 |
| 2017/0118246 | A1* | 4/2017 | Murthy | H04L 63/102 |
| 2017/0134937 | A1* | 5/2017 | Miller | G06Q 20/3829 |
| 2017/0187807 | A1* | 6/2017 | Clernon | H04L 67/34 |
| 2017/0208057 | A1* | 7/2017 | Wang | H04W 12/04 |
| 2018/0007140 | A1* | 1/2018 | Brickell | H04W 12/00 |
| 2018/0018663 | A1* | 1/2018 | Van | G07F 7/0873 |
| 2018/0091506 | A1* | 3/2018 | Chow | H04L 67/567 |
| 2018/0260807 | A1* | 9/2018 | Yang | G06Q 20/3276 |
| 2018/0276386 | A1* | 9/2018 | Roszak | G06F 9/4416 |
| 2019/0075020 | A1* | 3/2019 | Leal Monteiro | G06F 21/86 |
| 2020/0304445 | A1* | 9/2020 | Dinhthi | H04L 12/2834 |

\* cited by examiner

FIG. 4B

| | DEVICES > LIST VIEW > |
|---|---|
| DASHBOARD | ☐ QNX  🔍SEND ▽MORE  ⊙ 11/50 ⊙ |
| LIST VIEW | LINUX | 3.4.29 | OWNERSHIP: CORPORATE - DEDICATED  RECENT LIST |
| DETAILS VIEW | SUMMARY  COMPLIANCE  PROFILES  APPS  CONTENT  LOCATION  USER [PRODUCTS ∨]  ―442 |
| > LIFECYCLE | LAST SCAN: THURSDAY, 3 NOVEMBER 2016 4:40:35 AM  ↻ |
| > PROFILES | 🔍 JOBS  [FILTER GRID]  [Q⊙▷] |
| > COMPLIANCE POLICIES | | | | | | | [DOWNLOAD ALL PRODUCTS ⓐ]  [Q⊙▷] |
| > CERTIFICATES | NAME | PRODUCT SET | STATUS | TYPE | LAST JOB ID | DATE | LAST JOB STATUS |
| > PRODUCTS | p1 | | COMPLIANT | REQUIRED | 133744 | 3/11/2015 4:40:35 AM | COMPLETED |
| > PRINTERS | | CAPPROD | COMPLIANT | REQUIRED | 133745 | 3/11/2015 4:40:35 AM | COMPLETED |
| DEVICES SETTINGS ⚙ | | | 450 | | | 460 | PAGE SIZE [20 ▽] |
| | ITEMS 1-2 OF 2 | | | | | | |

440

Sidebar icons: HUB, DEVICES, ACCOUNTS, APPS & BOOKS, CONTENT, EMAIL, TELECOM, GROUPS & SETTINGS

OFFLINE SIDELOADING FOR ENROLLMENT OF DEVICES IN A MOBILE DEVICE MANAGEMENT SYSTEM

This application claims priority as a continuation of U.S. patent application Ser. No. 16/734,016, filed Jan. 3, 2020, which is a continuation of U.S. patent application Ser. No. 15/491,973, now U.S. Pat. No. 10,530,865, filed Apr. 19, 2017, both of which are expressly incorporated herein in their entireties.

BACKGROUND

Mobile device management ("MDM") systems allow an enterprise to manage computing device functionality. Typically, computing devices, such as phones, tablets, and laptops, enroll with the MDM system by connecting to a management server over a network, such as the Internet. This allows the MDM system to discover device attributes and enroll the computing device with the MDM system by installing software on the computing device. The computing device then generally remains in periodic communication with the management server to carry out management policies on the device.

However, some computing devices can go without Internet connectivity for long periods of time or may be otherwise unavailable to complete a traditional online enrollment process. An enterprise may wish to manage these computing devices in the MDM system, even though the devices cannot connect for initial enrollment. But because the computing device cannot exchange information over a network, the management server cannot discover device attributes and install the correct applications onto the computing device. As a result, an offline computing device cannot complete the enrollment process.

Manually configuring offline computing devices introduces inefficiencies and inconsistencies. A technician might not install the correct software or settings, particularly since each computing device can have different owners, hardware, and capabilities. And in some cases, limited user interface capabilities can prevent the technician from properly configuring software on the computing device.

Additionally, an offline computing device may need to be updated even though it is offline for long stretches or indefinitely. Assets, such as graphics or applications, may need to change over time. As an example, if a company introduces a new slogan, assets containing that slogan may need to be installed on the computing device. If the computing device is unmanaged, it is difficult to ensure that the correct configuration of assets is present. This is particularly true when many offline computing devices are involved and as assets evolve over time. As an example, vending machines on a cruise ship often cannot connect to the Internet for several months. Individual asset updates can be difficult, and MDM management generally has not been possible.

As a result, a need exists for offline MDM enrollment for computing devices.

SUMMARY

An example system for enrolling offline computing devices can include a management server with a management console. Computing devices can include any processor-based device, such as vending machines, terminals, toll or parking fee machines, hand-held scanners, cash registers, televisions, tablets, smart phones, laptops, or computer workstations.

The system can include a console with a graphical user interface ("GUI") that an administrator can use to manage the setup of computing devices. The console can be provided by a management server, which tracks MDM settings for enrolled computing devices. The console GUI can include a first set of options for creating a registration record. The registration record can be assigned to a user or device owner, and can include device attributes and a device identifier. The device attributes can describe the type of computing device to which the registration record can apply. The device attributes are also referred to as "custom attributes." In one example, the registration record includes information for a computing device 110 that is not yet enrolled.

In one example, a device owner can make application programming interface ("API") calls to upload device attributes to the management server. Those device attributes can apply to offline computing devices owned or controlled by the device owner.

The registration record can display on the console GUI with an option for offline enrollment, also referred to as offline provisioning. The administrator can select a button for offline enrollment instead of connecting over a network with a computing device to perform enrollment based on the registration record.

Selecting the offline provisioning option can cause the management server to enroll the computing device by converting the registration record into a device record. The device record can assign the registration record to a serial number of the device. The device record can be used by the management server to identify one or more smart groups that fit the specific offline computing device. Smart groups can specify settings and assets to install on the computing device. For example, the computing device can be associated with a particular organizational group that specifies particular applications, graphics, and settings that should apply to the offline computing device. Smart groups can also be assigned to a registration record prior to conversion to a device record, in one example.

Based on the device record, the management server can also determine which assets to provide to the offline computing device. The management server can create an offline provisioning file that incudes installation instructions for the assets. The assets can include applications, graphics, and settings. The provisioning file and assets can be downloaded onto a physical storage device, such as a USB drive. The provisioning file can include the assets in an example. The assets can alternatively be stored separately and referenced by the provisioning file.

A user can attach the storage device to the computing device. The computing device can access the provisioning file and install assets and apply settings as specified in the file. In one example, a management agent recognizes and parses the provisioning file. In one example, a management agent can also be one of the assets on the storage device. The management agent can enforce compliance rules on the computing device, and generally control device functionality as specified on the management server. In another example, the management agent is pre-installed on the computing device.

The management agent can cause the computing device to perform the installation. The management agent can also update its compliance policy based on settings in the provisioning file. In another example, the installation is manually started by the user. For example, an executable on the storage device (from the management server) can cause the management agent to install. Then the management agent can perform the rest of the installation based on instructions in the provisioning file.

The computing device can operate in a managed state while offline. If network access becomes available in the future, the management agent can cause the computing device to connect to the management server. The management server can check for asset or device updates, and provide the updates over the network to the computing device prior to it returning to an offline state.

It is to be understood that both the foregoing general description and the following detailed description are exemplary and explanatory only and are not restrictive of the claims.

BRIEF DESCRIPTION OF THE DRAWINGS

FIG. 4B is an exemplary illustration of a graphical user interface; and

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described here include systems for enrolling offline computing devices. An enterprise mobility management ("EMM") system can enroll and manage the offline computing devices and update the computing devices if they come online in the future. Unlike prior systems, a management server can enroll an offline computing device without communicating directly with the computing device over a network. Instead, using a console GUI, an administrator can enroll the offline computing device based on a registration record. The registration record can present an offline enrollment option, such as a button. Selecting this option can cause the management server to create a device record for the enrollment. The management server can create a provisioning file for installing assets on the computing device. The provisioning file and assets can be saved by the management server on a physical storage device, such as a USB drive.

To set up the computing device, a user can physically connect the storage device to the computing device. The assets can install on the computing device as specified in the provisioning file. In one example, a management agent on the computing device recognizes and reads the provisioning file. The management agent can be pre-installed on the computing device in one example. Alternatively, the management agent can be included as an asset on the storage device. The user can select an executable on the storage device that causes the management agent to install, or the provisioning file itself can be or include an executable file that performs this step. The management agent can check that the provisioning file corresponds to the computing device before installing the assets in one example, such as by comparing a serial number of the computing device to a serial number in the provisioning file.

After installation, the computing device can continue to operate in a managed state offline. If the computing device connects to a network in the future, the management agent can attempt to connect to the management server. The management server can check for device and asset updates, and provide the updates for installation while the network connectivity exists.

Figure 1:
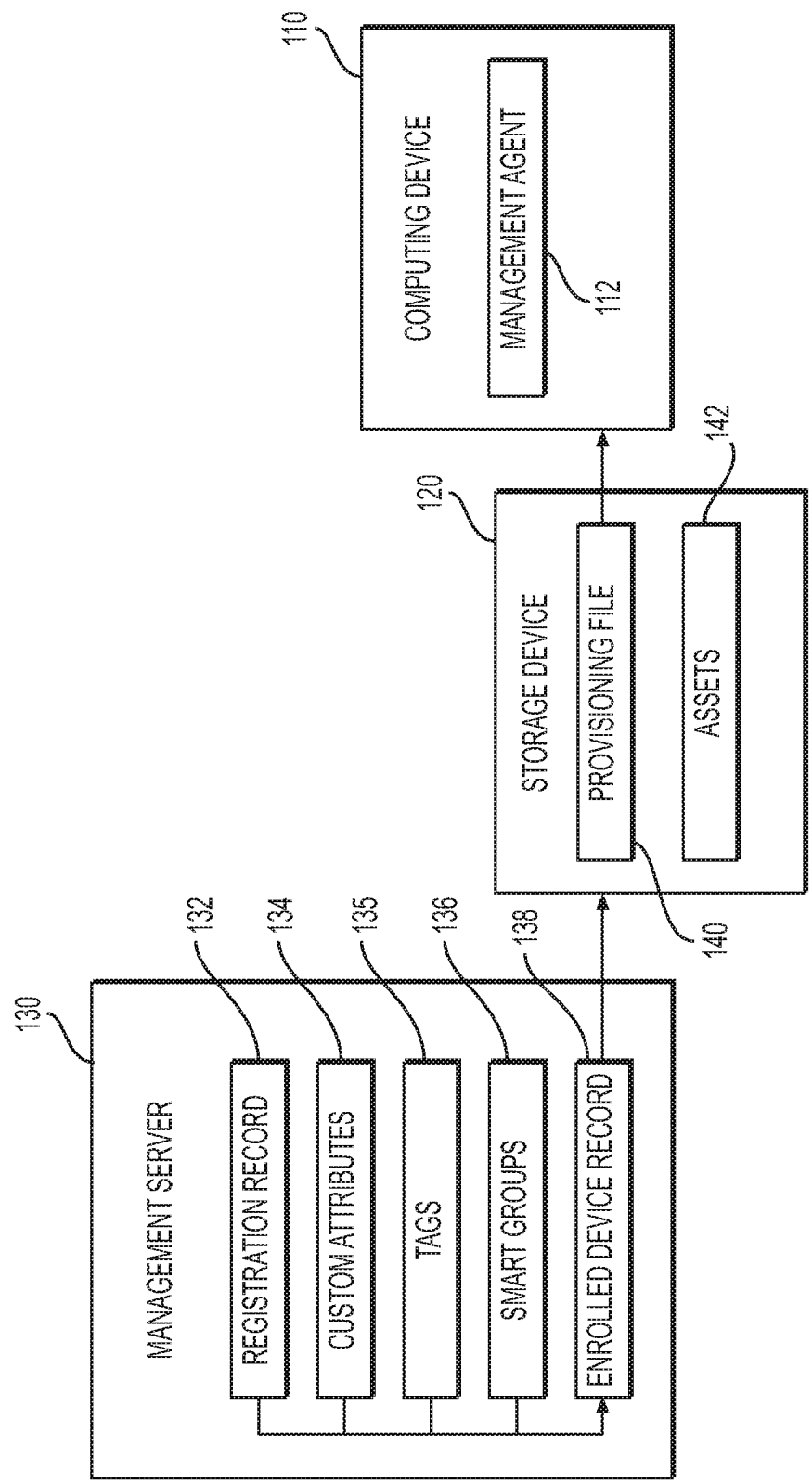
FIG. 1 is an exemplary illustration of system components.

FIG. 1 illustrates an exemplary system for enrollment and provisioning of offline computing devices. A computing device 110 can be assigned to a user or device owner in an example. Computing device 110 can be any processor-based device. Each computing device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

In one example, a management server 130 is located remotely from the computing device 110, such as on a cloud-hosted environment. The management server 130 can provide MDM functionality for enrolled computing devices 110, enforcing compliance rules on the computing device 110 and installing specific applications, among other MDM functionality. Enrollment can allow a management server 130 to install or configure a management agent 112 on the computing device 110 to control functionality of the computing device based on settings at the management server 130. For example, the management agent 132 can control functionality on the computing device 112, such as locking into a specific application or disabling access through certain ports or interfaces.

Traditional MDM enrollment can include uploading device attributes from the computing device 110 to the management server, and downloading applications from the management server 130 to the computing device 110. Therefore, traditional MDM systems would require the computing device 110 to enroll by connecting to the management server 130 over a network (such as the Internet) to complete enrollment. But as will be described, the management server 130 can alternatively complete enrollment of an offline computing device 110.

An administrator can use a console at the management server 130 to enroll the offline computing device 110. First, a registration record 132 can be created that describes the computing device 110. Registration records 132 can include information for computing devices 110 that are not enrolled yet at the management server 130.

The registration record 132 can include device attributes 134 and tags 135. Device attributes 134 can describe various aspects of the computing device 110, such as device type, hardware information and configurations, operating system version, vendor information, device location information, tracked usage statistics, ownership information, and other attributes. The device attributes 134 can allow the management server 130 to select the appropriate smart groups 136 and assets 142 to apply to that computing device 110. The registration record 132 can include any number of custom device attributes 134. The device attributes 134 can be used by the system to select the correct assets 142 for sending to the computing device 110 when the computing device 110 is enrolled. For example, a first company can have its own graphics, including logo, sent to a first computing device 110, whereas a second company can have different graphics and logo sent to a second computing device 110.

In one example, tags 135 can be device attributes 134 that are defined by the management server 130. For example, based on a set of attributes 134, tags 135 internal to the management server 130 can be applied. The tags 135 can indicate commonalities between devices, such as device types or owner. In one example, a tag 135 indicates a tenant, such as a customer of the MDM provider. The tags 135 can also be used as a basis for assigning smart groups 136. For example, the management server can map tags 135 to smart groups 136 in an example.

Registration records 132 can also include identifying information for the computing device 110, referred to as device identifiers. For example, serial numbers can be device identifiers that correspond to specific computing devices 110. The device identifier can alternatively be a code specified by a vendor or the management server 130 that can distinguish the computing device 110. Computing devices 110 can include device identifiers in a registry, firmware, or a computer information interface of the computing device 110. Alternatively, the device identifier can be a serial number that is affixed to the computing device 110.

A customer can create a registration record 132 by using an API at the management server 130. The API can allow for single device registration or bulk registration. As an example of bulk registration, a customer can upload a list of device identifiers and device attributes 134 to the management server 130. For example, using the GUI, a user or administrator can upload a data object containing device identifiers and corresponding device attributes 134 for processing at the management server 130. The data object can be an electronic spreadsheet, extensible markup language ("XML") file, or comma separated values ("CSV") among other things.

The administrator can use the console to browse or view registration records 132. A registration record 132 can be used for a normal enrollment process when the computing device 110 is online and can communicate with the management server 130. For example, a computing device 110 can connect to the management server 130, which locates a corresponding registration record 132 by device identifier, then begins the enrollment process.

However, the MDM system can also perform offline enrollment. When the computing device 110 is offline, an alternative enrollment option can be provided in the console. For example, an offline enrollment option, such as a button, can be displayed on the GUI with the registration record 132. This can allow the administrator to enroll one or more computing devices 110 without waiting for the computing device 110 to connect to the management server 130. This can be particularly useful when it is inconvenient or impossible for a computing device 110 to connect to a network. In one example, an administrator can use the offline enrollment option even if the computing device 110 is technically online. For example, firewalls, port mappings, or other networking issues might prevent smooth enrollment over the network, making offline enrollment desirable.

Selecting the offline enrollment option can cause the management server 130 to enroll the computing device 110 by converting the registration record 132 into a device record 138. The conversion can include determining assets and settings that apply to the computing device 110, based on the registration record 132. The device record 138 can associate the assets and settings to the computing device 110, and indicate that the computing device 110 is enrolled.

The management server 130 can determine which assets and settings apply to the device record 138 based on smart groups 136. Smart groups 136 can define groups of computing devices 110 that are intended to receive a particular feature set. The smart groups 136 can identify specific assets 142 and settings for implementation at computing devices 110. For example, the vending machine smart group can include graphics for display on the computing device 110, and an application for a GUI on the computing device 110. The settings can include compliance rules, which can govern what functionality is available on the computing device 110 and allow a management agent 112 to enforce security policies.

The registration record 132 or device record 138 can identify one or more smart groups 136 that pertain to the computing device 110. The smart groups 136 can be stored in the management server 130. The smart groups 136 can include tags 135 or other device attributes 134, allowing the management server 130 to automatically associate particular smart groups 136 with registration records 132 or device records 138.

In one example, the management server 130 can determine which smart groups 136 should apply to the computing device 110 based on a device attribute 134 comparison. A smart group 136 can be defined using any relevant device attributes 134, including a type of user, a type of device, a location of the device, device hardware, device software, device operating system, or an owner associated with the device, for example. The management server can retrieve device attributes 134 for a computing device 110 based on the registration record 132 or device record 138. By matching these retrieved device attributes 134 to the smart group 136 attributes, the management server 130 can determine which smart groups 136 apply to the device record 138.

A computing device 110 can belong to any number of smart groups 136. For example, a computing device 110 can belong to a smart group associated with WINDOWS 10 devices, as well as a smart group associated with a particular company's vending machines. The WINDOWS 10 smart group could be used to turn on or off particular device functionality specified in the vending machine smart group. For example, the settings could include turning off gambling functionality when the computing device 110 enters territory where it is not legal, or at particular times or days.

The smart groups 136 can also include device attribute 134 exclusions that ensure the management server 130 does not associate non-compatible device records 138 and smart groups 136. This can ensure the management server 130 does not provision assets that cannot be implemented at the computing device 110. As an example, a computing device running a thin version of WINDOWS or LINUX would not be able to use a package of applications and device settings for an IOS operating system. Similarly, hardware requirements, such as RAM, processing power, storage space, screen size, and audio capabilities can limit which assets (such as graphics, sounds, and applications) are usable.

The smart groups 136 can be assigned to the registration record 132 prior to enrollment, in one example. Alternatively, they can be assigned to the device record 138 after the offline provisioning option is selected. This can ensure that the computing device 110 is actually enrolled in the system before it is associated with various smart groups 136. In one example, the administrator can use a GUI to set various management options on the computing device 110, which are associated with the registration record 132 or device record 138.

In one example, the administrator can associate the computing device 110 with one or more smart groups 136, rather than relying on automatic recognition by the management server 130. This can also be done in addition to the automatic recognition of the management server 130.

The offline enrollment option can also cause the management server 130 to create a provisioning file 140. The provisioning file 140 can include instructions that cause the computing device 110 to apply settings and install assets, as specified by the device record 138. The provisioning file 138 can be downloaded onto a physical storage device 120 for later connection to the offline computing device 110. The storage device 120 can be any non-transitory, physical storage medium, such as a USB drive. After the provisioning file 140 has been created and the assets have been located, the management server 130 can update the device record 138 to indicate that the computing device 110 is successfully enrolled.

The provisioning file 140 can include or reference the assets 142 specified by the device record 138, in one example. The provisioning file 140 can be a .ZIP or .TAR file that contains a manifest with installation instructions. In one example, the provisioning file 140 can refer to assets 142 that are saved separately on the storage device 120. In one example, the management server 130 creates the provisioning file 140 automatically in conjunction with creating the device record 138. In another example, the device record 138 includes a separate offline provisioning button. This can allow the administrator or other user to generate a provisioning file 140 any time after a computing device 110 is enrolled.

After the provisioning file 140 and assets 142 are stored on the storage device 120, the storage device 120 can be used to update the computing device 110. A user can physically attach the storage device 120 to the computing device 110 (such as through a USB port). The computing device 110 can use the provisioning file 140 to install the assets 142 and apply settings, such as compliance rules, specified in the provisioning file 140.

In one example, a management agent 112 executing on the computing device 110 can recognize the provisioning file 140. The management agent 112 can parse the provisioning file 140 and perform various updates as specified in the file. For example, the management agent 112 can update compliance rules, configure functionality of an application (which can be one of the assets 142), and start tracking certain types of usage data. The management agent 112 can also turn on or off device functionality and modify networking settings.

The management agent 112 can pre-exist on the computing device 110. For example, the management agent 112 can be part of or provided with the operating system of the computing device 110, and exist on the computing device 110 prior to enrollment or side loading. Alternatively, the management agent 112 can be provided by the management server 130 on the storage device 120 as an asset 142. It can be installed on the computing device 110 by executing a file on the storage device 120. The executable can be the provisioning file 140 in an example.

The management agent 112 can be a portion of an operating system for the computing device 110, or it can operate in the application layer of the computing device 110. The management agent 112 can include a device-level component. Device-level components can include an API, agent application, hypervisor, or virtualized device. The management agent 112 can also include an application-level component. The application-level component can include an API, SDK, application wrapper, or workspace agent application. The device-level management agent can include system level privileges. The application-level management agent can include privileges in managed applications, which can be developed for operation with the management server 130. Reference to the management agent 112 is understood to include either or both of the device-level and application-level components unless otherwise specified.

After enrollment and installation is complete, the computing device 110 can continue to operate offline. The management agent 112 can enforce the settings, such as compliance rules, that are specified for the device record 138 and included in the provisioning file 140.

Future updates can be possible if the computing device 110 detects a network connection. In one example, the management agent 112 causes the computing device 110 to check periodically for a network connection. Upon detection, the management agent 112 can attempt to contact the management server 130 to check for updates. The management server 130 can interact with the management agent 112 with application-level calls to the application or device-level calls to the operating system of the first computing device 110. The management server 130 can send messages to the management agent 112 to control certain functions on the computing device 110.

While the network connectivity exists, the management server 130 can update settings of the computing device 110. The management server 130 can compare current device settings against those currently specified by the device record 138. The device record 138 can include new settings or assets that have changed since the computing device 110 was last online (or since the computing device 100 was last updated offline using a storage device 120). For example, associated smart groups can indicate new assets or compliance rules. Newer versions of assets can be sent from the management server 130 to the computing device 110. This can include updated graphics, sounds, or applications.

While connected over the network, the computing device 110 can download the new assets from the management server 130 for installation by the management agent 112. The management server 130 can also modify device settings and turn functionality on and off within the managed assets through calling subroutines in the management agent 112. If a permission control specifies it, the management server 130 can turn off functionality at the computing device 110, such as printing, emailing, or Internet access. This can allow for added security on the computing device 110.

The management server 130 can utilize the management agent 112 to install, disable, or uninstall the assets. The management server 130 can automatically disable, delete, or uninstall data including applications at the computing device 110 if a compliance breach is detected. This can help prevent hacking of the computing device 110. Alternatively, if the computing device 110 is lost or stolen, the management server 130 can cause the computing device 110 to remove data and remotely lock the computing device 110.

In one example, the management agent 112 ensures that the computing device 110 is in compliance with compliance rules set at the management server 130. If the computing device is not in compliance, the management agent 112 can cause the computing device to lock certain functionality or wipe user data.

A compliance rule can set forth one or more conditions that must be satisfied in order for a computing device 110 to be deemed compliant. If compliance is broken, the management agent 112 or management server 130 can take steps to control access of the computing device 110 to files, applications, or email. Compliance rules can be assigned differently to the different smart groups. For example, a vending machine group can be assigned different compliance rules than a staff group. The vending machine group might have email and networking functions disabled, whereas the staff group might have networking capabilities for communication locally on a cruise ship. Similarly, the management server 130 can assign different compliance rules based on the different grade levels of users or devices, or different geographic locations.

The determination of whether a computing device 110 is compliant can be made by the management server 130, the computing device 110, or a combination of both. For example, the management agent 112 on the computing device 110 can generate a data object that describes the state of the computing device 110, including any settings, parameters, applications, or other information regarding the state of the computing device 110. If network connectivity exists, the data object can be analyzed by the management server 130 or the computing device 110 to determine whether the computing device 110 is in compliance with compliance rules.

Alternatively, the compliance rules can be installed onto the computing device 110 from the provisioning file 140. This can allow the computing device 110 to analyze its own compliance. A management agent 112 installed on the computing device 110 can make the comparison between the data object and compliance rules. As a remedial action, the management agent 112 can cause the computing device 110 to lock itself when non-compliant. Other remedial actions are possible. In some cases, remedial actions can be staged, such that the user of a computing device 110 is provided with a chance to remedy noncompliance before being subjected to stricter remedial actions.

The management agent 112 can also set permissions within a managed application. This can include restricting which files or applications the user can access, or managing how long the access or use will last. The permissions can be locally stored on the computing device 110.

In one example, the management agent 112 can configure the same computing device 110 to function differently based on smart groups 136. For example, a first smart group 136 can exist for a first vending machine on a first cruise ship that is a family cruise. A second vending machine on an adult's-only cruise can be assigned to a second smart group. The graphics, items, and applications available on the two machines can differ to coincide with the appropriateness of each cruise. Functionality can also be different, such as no longer needing identification verification by an attendant on an adult's-only cruise.

The management server 130 can include one or more servers. Each server can include one or more processors that execute instructions stored on a non-transitory, computer-readable medium. The management server 130 can include any number of servers and processors.

The computing device 110 and management server 130 can each utilize one or more processors. The term "processor," as generally used herein, can refer to any logic processing unit, such as one or more central processing units ("CPUs"), digital signal processors ("DSPs"), application specific integrated circuits ("ASICs"), field programmable gate arrays ("FPGAs"), and similar devices. The processor can include one or more processors configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The computing device 110 and management server 130 can also include an I/O module, such as a console with an integrated keyboard and mouse to allow a user to input parameters associated with system 100. An I/O module can also include a display including a GUI for outputting information on a screen.

Figure 2:
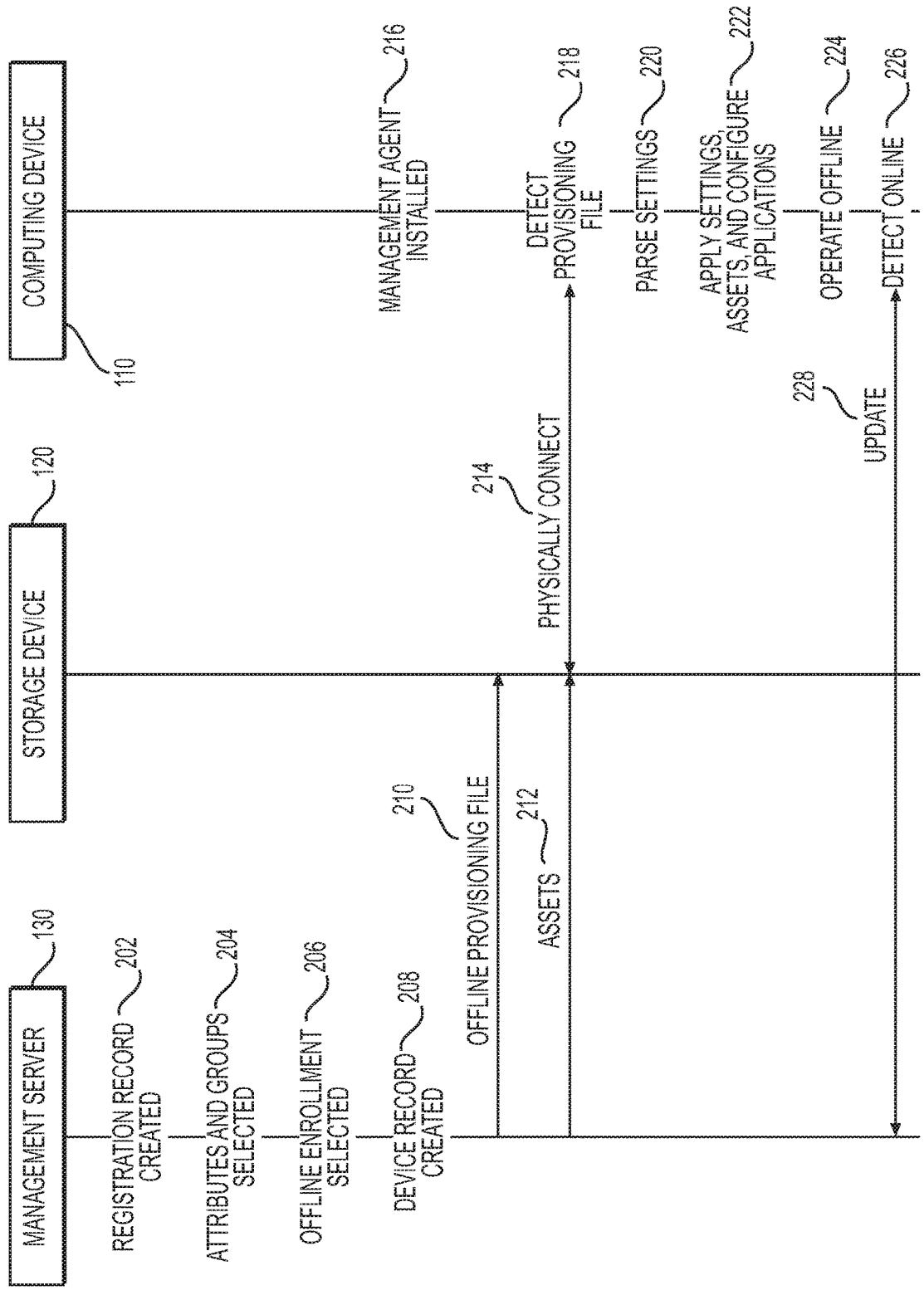
FIG. 2 is an exemplary flow chart of steps performed in a system.

FIG. 2 is an illustration of exemplary stages performed by a system. At stage 202, the management server 130 creates a registration record 132. In one example, an administrator can use a management console to manually create the registration record 132. The administrator can select a user to which the registration record 132 applies. A device identifier can also be included with the registration record. In another example, a customer or administrator can upload a list of device identifiers to create registration records 132. The management server 130 can have an API that allows customers to upload a formatted list, such as a spreadsheet or .XML file that the management server 130 parses and uses in creating registration records 132. The formatted list can include device identifiers and device attributes 134, in one example.

At stage 204, the management server 130 can associate device attributes 134 with the registration record 132. This can be done automatically by parsing attribute information from the formatted list. Alternatively, a customer or administrator can enter the device attributes 134 into a console. The management server 130 can similarly apply tags 135 that can be used to indicate commonalities between devices within the EMM system.

In one example, at stage 204, the management server 130 can also assign smart groups 136 to the registration record 132. This can be done automatically by the management server 130. For example, the management server 130 can determine which smart groups 136 match the device attributes 134 (such as tags 135) of the computing device 110. The registration record 132 can be updated to refer to those smart groups 136, in one example. The administrator can also manually add a smart group 136 to the registration record 132. Alternatively or in addition, smart groups 136 can be later assigned to the device record 138.

The registration record 132 can represent a non-enrolled computing device 110. When the registration record 132 is displayed in the console GUI, it can include an offline enrollment option. The offline enrollment option can be a button in the GUI.

At stage 206, the administrator can select the offline enrollment option. This can cause the management server 130 to enroll the computing device 110 without directly communicating with the computing device 110.

To enroll the computing device 110, at stage 208, the management server 130 can convert the registration record 132 into a device record 138. This can include determining the smart groups 136 that apply to the device record 138. As previously described, the registration record 132 can already identify one or more smart groups 136. Alternatively or in addition, the management server 130 can automatically attempt to detect appropriate smart groups 136 based on device attributes 134 (or tags 135), including device type, device hardware, and ownership information. In one example, a database correlates device identifiers with smart groups 136, allowing the management server 130 to look up the applicable smart groups 136.

At stage 210, the management server 130 can create a provisioning file 140. The provisioning file 140 can include the information needed for proper configuration of the computing device 110, according to the device record 138. Because the computing device 110 can be offline, the provisioning file 140 can provide settings that are necessary as part of enrollment. The provisioning file 140 can also include a device identifier that the computing device 110 can verify to ensure the correct settings and assets are applied to the right computing device 110.

The provisioning file 140 can be saved on a storage device 120, such as a USB drive, for physically connecting to the offline computing device 110. At stage 212, assets 142 associated with the device record 138 can also be saved on the storage device 120. The assets 142 can include any media, including graphics, sounds, or applications. Assets 142 can also include updates to applications believed to preexist on the computing device 110.

In one example, the assets 142 can be stored as part of the provisioning file 140. For example, the provisioning file 140 can be an archive, such as a .ZIP or .RAR file that can contain multiple assets and a manifest used by the computing device for installation and configuration of the assets and other device settings. Alternatively, the assets 142 can be stored separately on the storage device 120.

The assets 142 can include a management agent 112, in one example. The management agent 112 can be selected based on device attributes 134 or tags 135, such as operating system and MDM version of the computing device 110. The management agent 112 can be part of an executable that causes the management agent 112 to install on the computing device 110.

In one example, an offline enrollment option at stage 206 can cause the enrollment of multiple computing devices 110. In this example, multiple provisioning files 140 can be created at stage 210. Each provisioning file 140 can include a device identifier corresponding to a different computing device 110. Alternatively, if multiple computing devices 140 are being provisioned with the same settings and assets 142, a single provisioning file 140 can include the device identifiers of each of those computing devices 110.

The management server 130 can save space on the storage device 120 by only saving a single copy of each unique asset 142. As an example, multiple provisioning files 140 on the storage device 120 can be set to install the same asset on multiple computing devices 110, and configure that asset 142 a variety of ways. But the storage device 120 need only contain a single copy of that asset 142 for each computing device 110 to install and configure.

At stage 214, a user can physically connect the storage device 120 to the computing device 110. If the storage device 120 is a USB drive, this can include plugging the USB drive into a USB port of the computing device 110. However, different types of storage devices 120 and ports are also possible.

In one example, a management agent 112 executes on the computing device 110. The management agent 112 can be pre-installed at stage 216. For example, the initial setup of the computing device 110 can include installation of the management agent 112, from a golden disk or other source. In another example, the management agent 112 is installed or updated from the storage device 120. For example, the management agent 112 can be installed by executing an executable asset 142 on the computing device 110.

At stage 218, the computing device 110 can detect the provisioning file 140. In one example, the management agent 112 detects the provisioning file. The management agent 112 can also parse the provisioning file and determine whether it applies to the computing device 110. This can include analyzing multiple provisioning files 140 on a single storage device 120 to match a device identifier of the computing device 110 to a device identifier of the provisioning file 140. This can be a serial number comparison in one example, but other types of device identifiers are possible. If no match is detected, the management agent 112 can decline asset installation and ignore the instructions in the provisioning file 140.

At stage 220, the management agent 112 can parse the provisioning file 140 to read settings to apply to the computing device 110. This can include parsing and reading a manifest file that is within the provisioning file 140. The settings can include compliance rules or device settings, such as turning off BLUETOOTH. The settings can also indicate which assets on the storage device 120 to copy onto the computing device 110.

At stage 222, the management agent 112 can apply the settings. This can include updating the compliance policy. It can also include copying over the relevant assets 142. Some of these assets 142 can be applications that the management agent configures according to the settings.

After installation is complete, the computing device 110 can continue operating offline at stage 224. While doing so, the management agent 112 can continue to enforce the compliance policy. If the computing device 110 becomes noncompliant, the management agent 112 can lock the computing device 110 or take other remedial actions. For example, if the computing device 110 attempts to use a prohibited or non-secure computing channel of if an authorized application is detected on the computing device 110, the management agent 110 can take remedial actions. The remedial actions can include locking the computing device 110 or disabling applications. In one example, an administrator can login to resolve the non-compliance and cause the management agent 112 to unlock the device.

In one example, the computing device 110 can continue to check for network connectivity. At stage 226, the computing device 110 can detect that is online. For example, a vending machine in a cruise ship can come back to port where wireless Internet access is available. As a result, at stage 228, the management agent 112 can check with the management server 130 for an update. The management server 130 can send updated assets 142 and settings to the computing device 110 over the network. Additionally, the computing device 110 can report usage statistics and other details to the management server 130.

Figure 3:
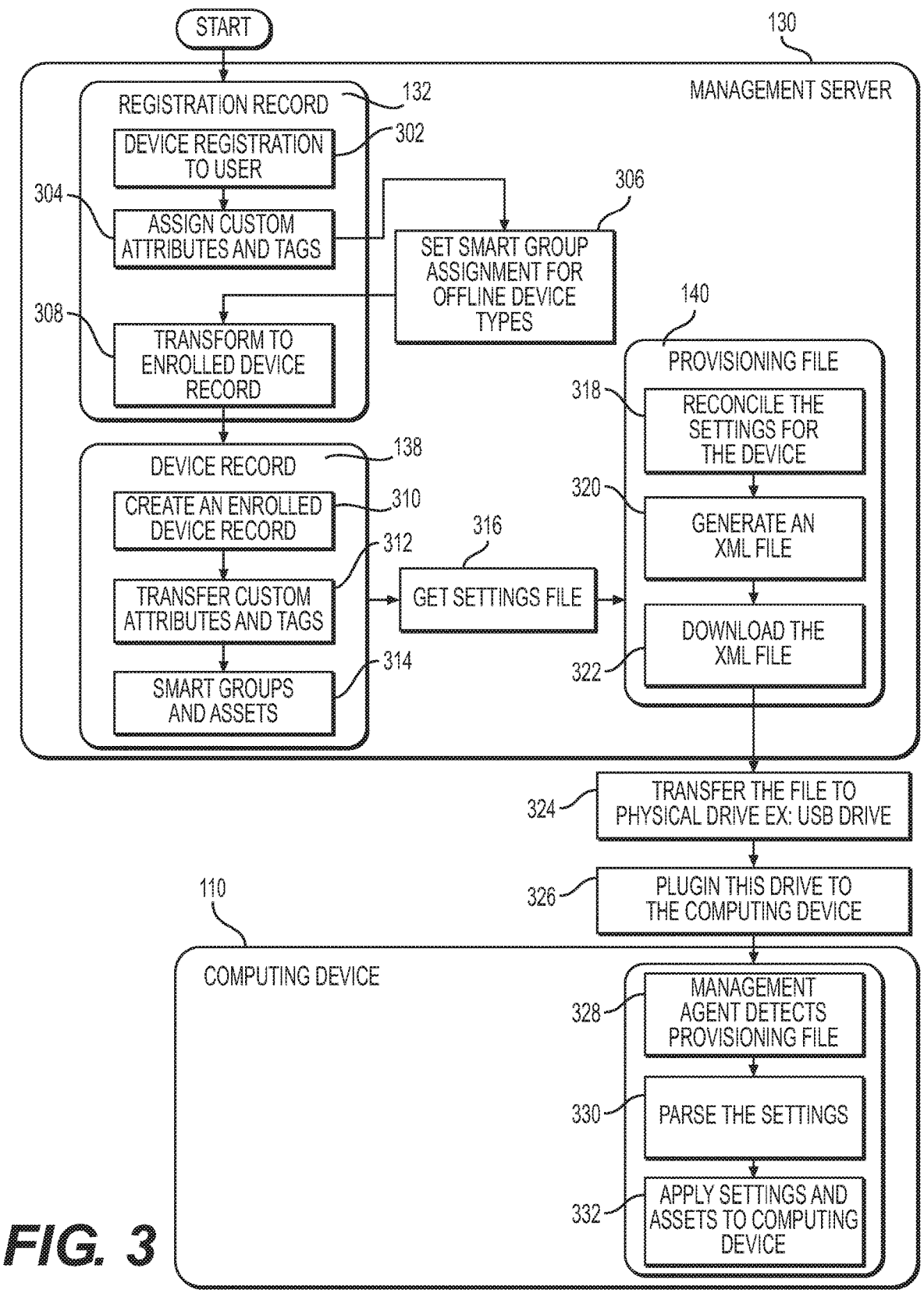
FIG. 3 is an exemplary flow chart of steps performed in a system.

FIG. 3 is an exemplary flow chart with stages performed by a system. At stage 302, the management server 130 can create a registration record 132 that is assigned to a user. The user can represent a client, device owner, or device recipient, in an example. At stage 304, device attributes 134 are assigned to the registration record 132, as has been described previously.

At stage 306, smart groups can be assigned to the registration record 132. As explained previously, this can be done automatically by the management server 130 based on the device attributes 134, in an example. Alternatively, an administrator or user logged into the console can select smart groups 136 to apply to the registration record 132. The management server 130 can check the device attributes 134 to make sure the smart group 136 does not cause a conflict. For example, if the registration record 132 indicates the computing device 110 runs WINDOWS but the selected smart group 136 is for ANDROID, then the console can reject the selection or warn the user.

At stage 308, the registration record 132 is converted to a device record 138 as part of offline enrollment. For example, a user can select an offline enrollment button in the GUI screen for the registration record 132. A device record 138 can then be created at stage 310. At stage 312, device attributes 134 can be copied over or translated from the registration record 132 to the device record 138. At stage 314, smart groups 136 and related assets 142 can be associated with the device record 138. (In one example, stage 306 is performed after stage 308.) The assets 142 can be specified by the smart groups 136. Additional assets 142 can be determined based on device ownership in one example.

Settings based on the device record 138 can be retrieved at stage 316. The management server 130 can format the settings at stage 318, and determine which settings need to be sent to the computing device 110. These settings can be part of the provisioning file 140.

At stage 320, the provisioning file 140 is created. In one example, the provisioning file 140 is an XML, file. The XML file can be formatted in a predefined way that a management agent 112 can read. In one example, the XML file is a manifest inside of the provisioning file 140, which can be an archive. XML is just one example file type, and any other file type can be used instead.

At stage 322, the provisioning file 140 is downloaded to local storage on the management server 130 or to a client device that is accessing the management console. Assets 142 can also be downloaded and stored as part of the provisioning file 140 or separate from the provisioning file 140.

At stage 324, the provisioning file 140 and assets 142 are transferred to a storage device 120, such as a USB drive. The storage device 120 is then physically connected to the offline computing device 110 at stage 326.

At stage 328, the management agent 112 on the computing device 110 detects the provisioning file 140. The management agent 112 can be pre-installed or part of the operating system in one example. Alternatively, one of the assets 142 can be a management agent 112 that the user installs on the computing device 110.

The management agent 112 can parse the settings of the provisioning file 140 at stage 330. This can include verifying that the provisioning file 140 applies to the computing device 110 based on a device identifier. If there is a match, then the management agent 112 can begin applying the settings and installing assets 142 at stage 332.

Figure 4A:
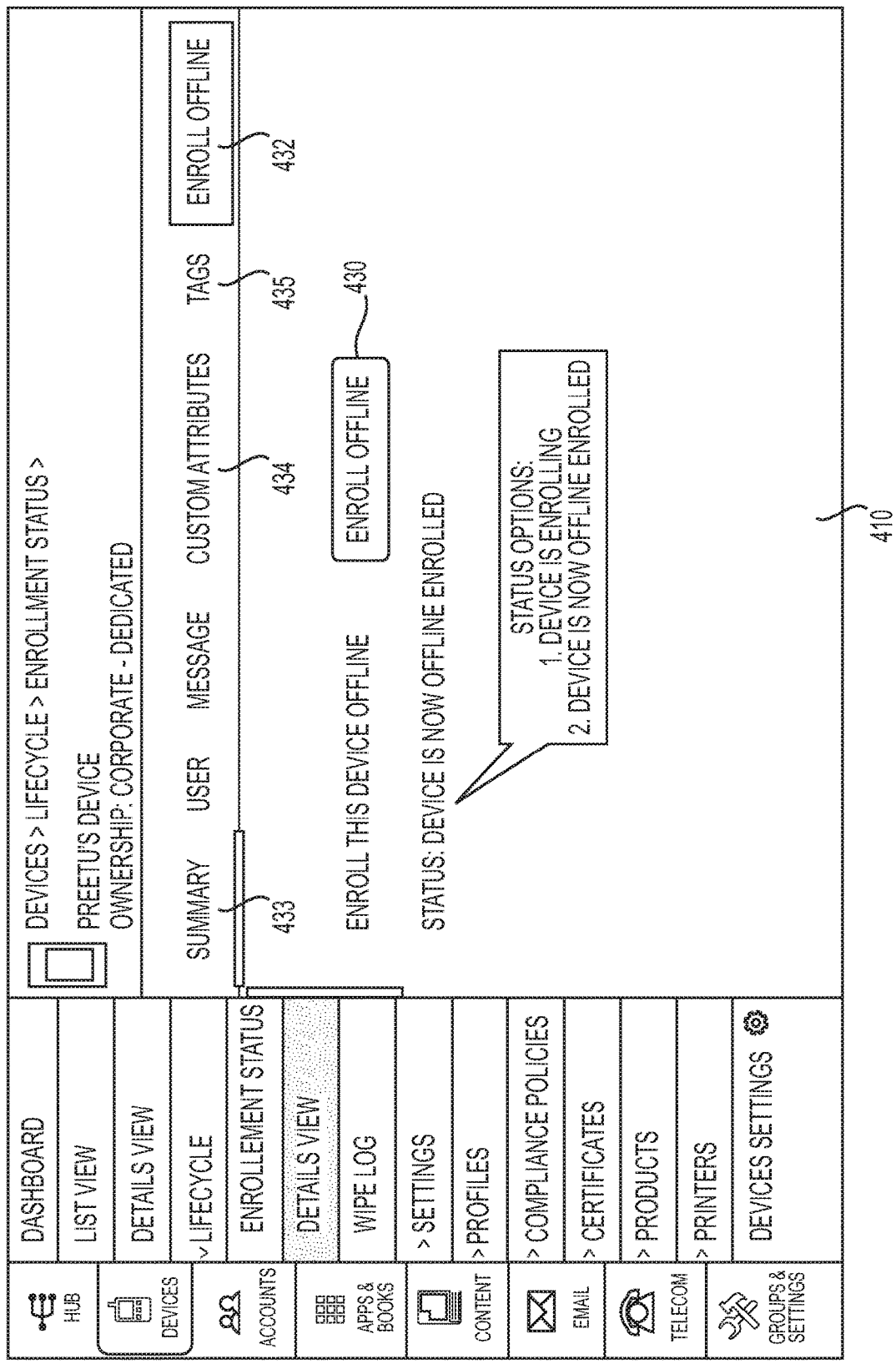
FIG. 4A is an exemplary illustration of a graphical user interface.

FIG. 4A is an example console GUI displaying a registration record screen 410. The registration record screen 410 can include options to view device attributes 434 and tags 435. A summary 433 tab can present an overview of the registration record 132. In this example, an offline enrollment tab 432 is selected. This causes an offline enrollment button 430 to display. Selecting the button 430 can cause offline enrollment to begin.

As offline enrollment is taking place, status updates can appear on the screen 410. For example, the status can state that the device is enrolling. Once enrollment is complete, the status can state that the device is offline enrolled.

FIG. 4B includes an example GUI screen 440 for a device record 138 for an enrolled computing device 110. In this example, the computing device is named QNX, runs Linux, and is corporate owned. A products tab 442 can list assets 142 associated with the computing device 110. The assets can be identified as compliant 450 with a compliance policy associated with the device record 138. In this example, a "Download All Products" button can cause the management server 130 to provide the assets 142 and provisioning file 140. A status 460 can indicate that the assets 142 were successfully downloaded.

Figure 5:
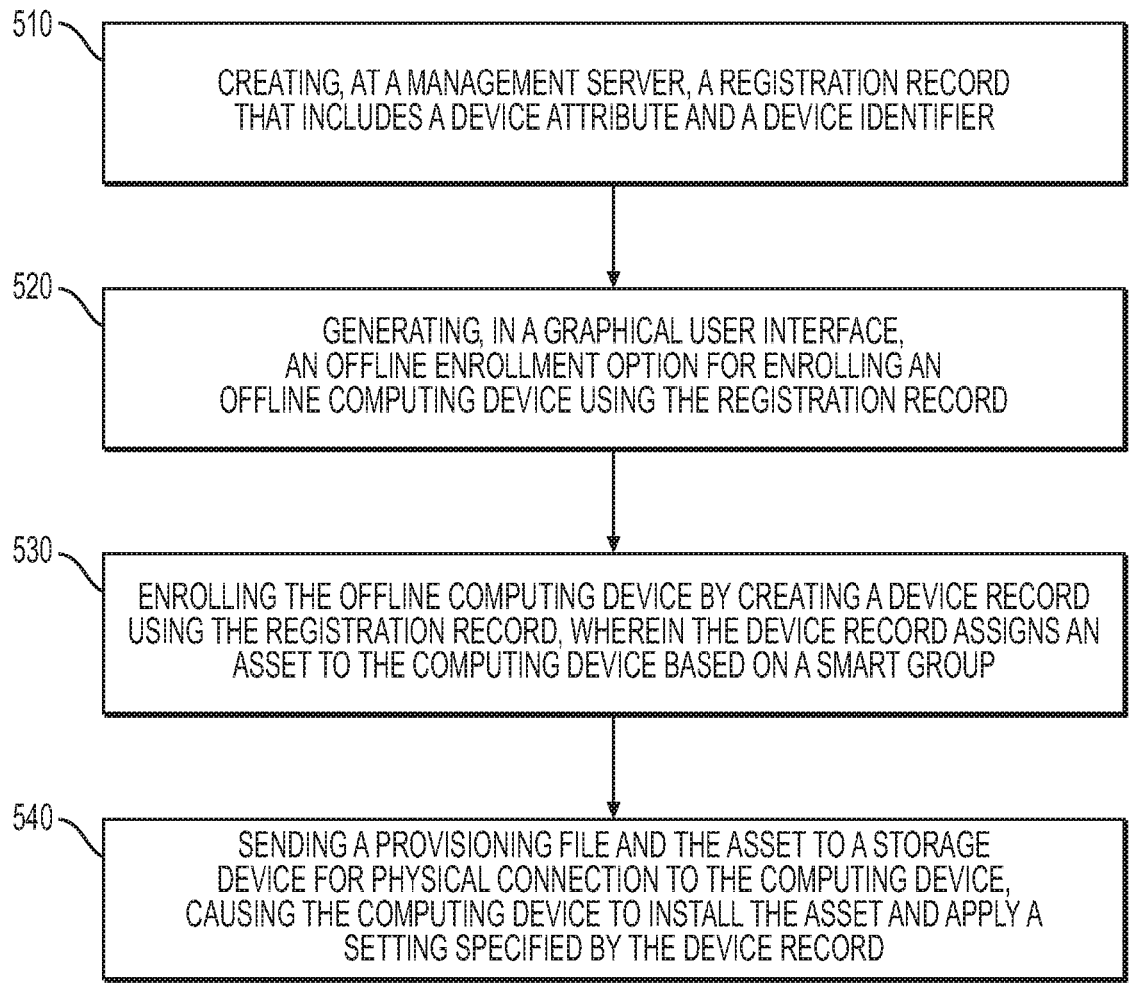
FIG. 5 is an exemplary flow chart of steps performed in a system.

FIG. 5 illustrates exemplary stages for performance by a system. At stage 510, the management server 130 creates a registration record 132. The registration record 132 can include at least one device attribute 134. It can also include a device identifier that ties the registration record to a particular computing device 110. The registration record 132 can be manually generated in one example. Alternatively, it can be generated as part of a bulk data upload by a customer. The customer or administrator can access a portal to enter device attributes 134 in one example. The portal can include a management console that modifies settings at the management server 130. The console can include options for assigning device identifiers 134 to the registration record 132.

At stage 520, the registration record 132 can be displayed in a console GUI. The GUI can include an offline enrollment option 430, such as a button or link. The user or administrator can select the offline enrollment option 430 to begin the offline enrollment of the computing device 110 associated with the registration record 132.

At stage 530, the management server 130 can create a device record 138 that indicates the computing device 110 is enrolled. The GUI can display a status that updates as the device record 138 is created and the management server 130 builds associations with smart groups 136, settings, compliance rules, and assets 142. An asset 142 can be assigned to the device record 138 based on a smart group 136 identified by the registration record 132 or a smart group 136 that meets device attributes 134 of the registration record 132.

At stage 540, a provisioning file 140 can be created by the management server 130. The provisioning file 140 can include device settings based on the device record 138. The device settings can include compliance policies and asset 142 configurations. The provisioning file can also specify which asset(s) applies to the computing device 110. Both the provisioning file 140 and the asset(s) 142 can be saved onto a storage device 120, such as a USB drive. Then, that USB drive can be physically connected to a USB port of the computing device 110.

The provisioning file 140 can cause the computing device 110 to install assets and apply settings. In one example, a management agent 112 executing on the computing device 110 detects the storage device and checks for the provisioning file 140. The management agent 112 can parse the provisioning file 140 and install the assets 142 as specified in the provisioning file 140.

The management agent 112 can pre-exist on the computing device 110 prior to connection of the storage device 120. Alternatively, the storage device 120 can include an installer for the management agent 112. The management agent 112 can also be provided as an asset 142, and selected by the management server 130 based on device attributes 134 of the registration record 132 or device record 138. For example, management agent 112 selection can be based on operating system version and hardware capabilities of the computing device 110.

After the assets and settings are applied, the computing device 110 can continue to operate offline in a managed state. In one example, the computing device 110 can come online at some time in the future. Upon doing so, the management agent 112 can contact the management server 130 and request updates. The management agent 112 can be pre-configured by the management server 130 with access addresses and credentials needed for communicating with the management server 130.

Other examples of the disclosure will be apparent to those skilled in the art from consideration of the specification and practice of the examples disclosed herein. The examples are not limited to any particular environment, and can be applied to workplace, classroom, and other environments. The examples can be used to efficiently configure and manage computing devices regardless of whether those computing devices are online.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for configuring an offline computing device, comprising:
    receiving, at a storage device, a provisioning file that includes a graphics package corresponding to a group of devices to which the offline computing device is assigned;
    transferring the provisioning file to the offline computing device using a physical connection between the offline computing device and the storage device;
    verifying, by the offline computing device, that the provisioning file applies to the offline computing device based on a device identifier in the provisioning file matching a device identifier of the offline computing device;
    installing the graphics package on the offline computing device; and
    displaying one or more elements associated with the graphics package at the offline computing device.

2. The method of claim 1, wherein the offline computing device is assigned to the smart group by an administrator through a graphical user interface associated with a management server.

3. The method of claim 1, wherein the offline computing device is assigned to the smart group based on a registration record stored at a management server, wherein the registration record includes device attributes corresponding to the offline computing device.

4. The method of claim 1, wherein the provisioning file is generated at a management server using a device record for the offline computing device, the device record including the device identifier for the offline computing device and an indication of the smart group to which the offline computing device is assigned.

5. The method of claim 1, wherein the provisioning file includes a second graphics package corresponding to a second group of devices to which the offline computing device is not assigned, and wherein the device identifier is specific to the graphics package but not the second graphics package.

6. The method of claim 5, further comprising:
    transferring the provisioning file to a second offline computing device using a physical connection between the second offline computing device and the storage device;
    verifying, by the second offline computing device, that the provisioning file applies to the second offline computing device based on a second device identifier in the provisioning file matching a device identifier of the second offline computing device;
    installing the second graphics package on the second offline computing device; and
    displaying one or more elements associated with the second graphics package at the second offline computing device.

7. The method of claim 1, wherein the provisioning file is configured to cause a management agent on the offline computing device to communication with the management server in an instance where the offline computing device connects to a network.

8. A non-transitory, computer-readable medium containing instructions executed by at least one processor to perform stages for configuring an offline computing device, the stages comprising:
    receiving, at a storage device, a provisioning file that includes a graphics package corresponding to a group of devices to which the offline computing device is assigned;
    transferring the provisioning file to the offline computing device using a physical connection between the offline computing device and the storage device;
    verifying, by the offline computing device, that the provisioning file applies to the offline computing device based on a device identifier in the provisioning file matching a device identifier of the offline computing device;
    installing the graphics package on the offline computing device; and
    displaying one or more elements associated with the graphics package at the offline computing device.

9. The non-transitory, computer-readable medium of claim 8, wherein the offline computing device is assigned to the smart group by an administrator through a graphical user interface associated with a management server.

10. The non-transitory, computer-readable medium of claim 8, wherein the offline computing device is assigned to the smart group based on a registration record stored at a management server, wherein the registration record includes device attributes corresponding to the offline computing device.

11. The non-transitory, computer-readable medium of claim 8, wherein the provisioning file is generated at a management server using a device record for the offline computing device, the device record including the device identifier for the offline computing device and an indication of the smart group to which the offline computing device is assigned.

12. The non-transitory, computer-readable medium of claim 8, wherein the provisioning file includes a second graphics package corresponding to a second group of devices to which the offline computing device is not assigned, and wherein the device identifier is specific to the graphics package but not the second graphics package.

13. The non-transitory, computer-readable medium of claim 12, the stages further comprising:
    transferring the provisioning file to a second offline computing device using a physical connection between the second offline computing device and the storage device;
    verifying, by the second offline computing device, that the provisioning file applies to the second offline computing device based on a second device identifier in the provisioning file matching a device identifier of the second offline computing device;

installing the second graphics package on the second offline computing device; and displaying one or more elements associated with the second graphics package at the second offline computing device.

14. The non-transitory, computer-readable medium of claim 8, wherein the provisioning file is configured to cause a management agent on the offline computing device to communication with the management server in an instance where the offline computing device connects to a network.

15. A system for configuring an offline computing device, comprising:
- a non-transitory, computer-readable medium that comprises instructions; and
- a processor that executes the instructions to perform stages comprising:
  - receiving, at a storage device, a provisioning file that includes a graphics package corresponding to a group of devices to which the offline computing device is assigned;
  - transferring the provisioning file to the offline computing device using a physical connection between the offline computing device and the storage device;
  - verifying, by the offline computing device, that the provisioning file applies to the offline computing device based on a device identifier in the provisioning file matching a device identifier of the offline computing device;
  - installing the graphics package on the offline computing device; and
  - displaying one or more elements associated with the graphics package at the offline computing device.

16. The system of claim 15, wherein the offline computing device is assigned to the smart group by an administrator through a graphical user interface associated with a management server.

17. The system of claim 15, wherein the offline computing device is assigned to the smart group based on a registration record stored at a management server, wherein the registration record includes device attributes corresponding to the offline computing device.

18. The system of claim 15, wherein the provisioning file is generated at a management server using a device record for the offline computing device, the device record including the device identifier for the offline computing device and an indication of the smart group to which the offline computing device is assigned.

19. The system of claim 15, wherein the provisioning file includes a second graphics package corresponding to a second group of devices to which the offline computing device is not assigned, and wherein the device identifier is specific to the graphics package but not the second graphics package.

20. The system of claim 19, the stages further comprising:
- transferring the provisioning file to a second offline computing device using a physical connection between the second offline computing device and the storage device;
- verifying, by the second offline computing device, that the provisioning file applies to the second offline computing device based on a second device identifier in the provisioning file matching a device identifier of the second offline computing device;
- installing the second graphics package on the second offline computing device; and
- displaying one or more elements associated with the second graphics package at the second offline computing device.

* * * * *